US010328562B2

(12) United States Patent
Benson et al.

(10) Patent No.: US 10,328,562 B2
(45) Date of Patent: Jun. 25, 2019

(54) HANDHELD KITCHEN APPLIANCE ASSEMBLY

(71) Applicant: TTI (MACAO COMMERCIAL OFFSHORE) LIMITED, Macau (MO)

(72) Inventors: Cheung Chun Kit Benson, Tsing Yi (CN); Fung Wai Keung, Tsuen Wan (CN)

(73) Assignee: TTI (MACAO COMMERCIAL OFFSHORE) LIMITED, Macau (MO)

(*) Notice: Subject to any disclaimer, the term of this patent is extended or adjusted under 35 U.S.C. 154(b) by 155 days.

(21) Appl. No.: 15/389,706

(22) Filed: Dec. 23, 2016

(65) Prior Publication Data

US 2018/0178367 A1 Jun. 28, 2018

(51) Int. Cl.
| B25F 3/00 | (2006.01) |
| A47J 43/044 | (2006.01) |
| A47J 43/06 | (2006.01) |
| A47J 42/46 | (2006.01) |
| A47J 43/08 | (2006.01) |
| B25F 5/02 | (2006.01) |
| A47J 43/07 | (2006.01) |

(52) U.S. Cl.
CPC ............... B25F 3/00 (2013.01); A47J 42/46 (2013.01); A47J 43/044 (2013.01); A47J 43/06 (2013.01); A47J 43/082 (2013.01); B25F 5/02 (2013.01); *A47J 2043/04427* (2013.01); *A47J 2043/0738* (2013.01)

(58) Field of Classification Search
CPC .. A47J 43/06; A47J 43/04427; A47J 43/0738; A47J 2043/04427; A47J 2043/0738; A47J 43/044; A47J 43/082; B25F 3/00; B25F 5/02

USPC .................................................. 366/129
See application file for complete search history.

(56) References Cited

U.S. PATENT DOCUMENTS 3,518,523 A 6/1970 Main
3,650,029 A 3/1972 Trelc
(Continued)

FOREIGN PATENT DOCUMENTS

CN 201879523 6/2011
CN 102258337 11/2011
(Continued)

*Primary Examiner* — Marc C Howell
(74) *Attorney, Agent, or Firm* — Michael Best & Friedrich LLP

(57) ABSTRACT

A handheld kitchen appliance assembly including a drive unit having a housing, a rechargeable battery disposed within the housing, and a motor disposed within the housing and powered by the battery. The handheld appliance assembly also includes a tool having an attachment portion for releasably connecting the tool to the drive unit. The tool is selectively driven by the drive unit when the tool is connected to the drive unit. A charging unit includes a cavity sized and shaped to receive a portion of the drive unit. The charging unit includes a power supply and is configured to send a charging current to the battery of the drive unit to recharge the battery when the drive unit is received within the cavity. A cradle includes an opening sized and shaped to support the tool when the tool is disconnected from the drive unit. The cradle includes a linkage that is engagable with the charging unit for selectively connecting the cradle to the charging unit.

14 Claims, 17 Drawing Sheets

(56) References Cited

U.S. PATENT DOCUMENTS

| | | | |
|---|---|---|---|
| 4,575,255 A * | 3/1986 | Kafka | A47J 43/044 366/129 |
| 4,965,909 A | 10/1990 | McCullough et al. | |
| 5,012,582 A | 5/1991 | Bristol et al. | |
| 5,921,658 A | 7/1999 | Kovacik et al. | |
| 6,431,425 B1 | 8/2002 | Moorman et al. | |
| D462,569 S * | 9/2002 | Chin | D7/376 |
| 6,568,843 B1 | 5/2003 | Lai | |
| 6,637,925 B1 | 10/2003 | Beaudet et al. | |
| 7,371,003 B2 | 5/2008 | Hamelin | |
| 8,353,620 B2 | 1/2013 | Ogrizek et al. | |
| 8,757,287 B2 | 6/2014 | Mak et al. | |
| 2003/0178959 A1 | 9/2003 | Wong et al. | |
| 2004/0167675 A1 | 8/2004 | Bednorz et al. | |
| 2006/0081586 A1 | 4/2006 | Ramsay | |
| 2008/0298164 A1 | 12/2008 | Wilson | |
| 2009/0213685 A1 * | 8/2009 | Mak | A47J 43/0755 366/129 |
| 2009/0303830 A1 | 12/2009 | Wilson | |
| 2015/0009776 A1 | 1/2015 | Cheung et al. | |

FOREIGN PATENT DOCUMENTS

| | | |
|---|---|---|
| CN | 103202666 | 7/2013 |
| CN | 103211525 | 7/2013 |
| CN | 203263140 | 11/2013 |
| CN | 203709876 | 7/2014 |
| CN | 203914634 | 11/2014 |
| CN | 203953406 | 11/2014 |
| CN | 204654704 | 9/2015 |
| CN | 204654712 | 9/2015 |
| CN | 205006701 | 2/2016 |
| DE | 202006011512 | 10/2006 |
| DE | 202011101707 | 9/2011 |
| DE | 102011082168 | 3/2013 |
| EP | 0956797 | 11/1999 |
| EP | 1182954 | 10/2005 |
| EP | 1935302 | 6/2008 |
| EP | 2193734 | 6/2010 |
| EP | 2394544 | 12/2011 |
| EP | 2394545 | 12/2011 |
| EP | 2394546 | 12/2011 |
| EP | 2394548 | 12/2011 |
| WO | 2004112558 | 12/2004 |
| WO | 2007020135 | 2/2007 |
| WO | 2007020142 | 2/2007 |
| WO | 2008011852 | 1/2008 |
| WO | 2010012724 | 2/2010 |
| WO | 2013097702 | 7/2013 |
| WO | 2014124859 | 8/2014 |
| WO | 2014206844 | 12/2014 |
| WO | 2014207192 | 12/2014 |

* cited by examiner

HANDHELD KITCHEN APPLIANCE ASSEMBLY

FIELD OF INVENTION

The present invention relates to kitchen appliances. In particular the invention relates to handheld kitchen appliances that are battery operated.

BACKGROUND

Handheld kitchen appliances, such as blenders, slicing knifes, cork screws, and can openers have evolved from a purely manual operation, with no assistance from a motor, to an automatic operation with the assistance of a motor. Initially, the motors of these appliances were powered by AC power and required a power cord. However, in recent years many kitchen appliances have been redesigned to be battery operated. Both types of motor operated appliances help automatic kitchen tasks and require less effort by the user. However, the size of the kitchen appliances has increased due to the motor and additional parts. Therefore, these appliances require more space in cabinets or on kitchen counters. Additionally, although the battery operated appliances provide a benefit of being coreless, they require that the batteries be recharged or replaced. This may also require individual charging stations for each appliance, which again requires additional storage space.

SUMMARY

In one construction, the invention provides a handheld kitchen appliance assembly including a drive unit having a housing, a rechargeable battery disposed within the housing, and a motor disposed within the housing and powered by the battery. The handheld appliance assembly also includes a tool having an attachment portion for releasably connecting the tool to the drive unit. The tool is selectively driven by the drive unit when the tool is connected to the drive unit. A charging unit includes a cavity sized and shaped to receive a portion of the drive unit. The charging unit includes a power supply and is configured to send a charging current to the battery of the drive unit to recharge the battery when the drive unit is received within the cavity. A cradle includes an opening sized and shaped to support the tool when the tool is disconnected from the drive unit. The cradle includes a linkage that is engagable with the charging unit for selectively connecting the cradle to the charging unit.

In another construction, the invention provides a base for supporting a kitchen appliance including a drive unit and a plurality of tools configured to be driven by the drive unit. The drive unit has a rechargeable battery, a motor, and a first electrical contact. The plurality of tools each has a tool element and an attachment portion for releasably connecting the tool to the drive unit. The base includes a charging unit including a cavity sized and shaped to receive a portion of the drive unit to support the drive unit. The cavity includes a second electrical contact, in which the second electrical contact is configured to engage with the first electrical contact of the drive unit when the drive unit is received within the charging unit. A power supply is connected to the charging unit. The power supply is configured to provide power to the charging unit to enable the charging unit to send a charging current to the battery of the drive unit via the first electrical contact and the second electrical contact. The base further includes a plurality of cradles for supporting the plurality of tools. The plurality of cradles each includes an opening sized and shaped to receive one of the plurality of tools.

In yet another construction, the invention provides a handheld kitchen appliance assembly including a drive unit including a housing having an elongated body with a first end and a second end that is spaced apart from the first end. A rechargeable battery is disposed within the housing, and a motor disposed within the housing and is powered by the battery. An attachment member is positioned on the second end of the housing, and a first electrical contact is positioned on the second end of the housing. The electrical contact is configured to receive a charging current and send the charging current to the battery to recharge the battery. The handheld kitchen appliance further includes a tool including a tool element and an attachment portion. The attachment portion is configured to engage with the attachment member of the drive unit to connect the tool to the drive unit. The handheld kitchen appliance further includes a base including a charging unit having a cavity with a second electrical contact. The cavity is configured to receive the second end of the drive unit so that the first electrical contact of the drive unit engages with the second electrical contact of the charging unit. The second electrical contact is configured to send the charging current to the first electrical contact. The base further includes a cradle having an opening for receiving a portion of the tool. The cradle includes a linkage that is engagable with the charging unit for selectively connecting the cradle to the charging unit.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
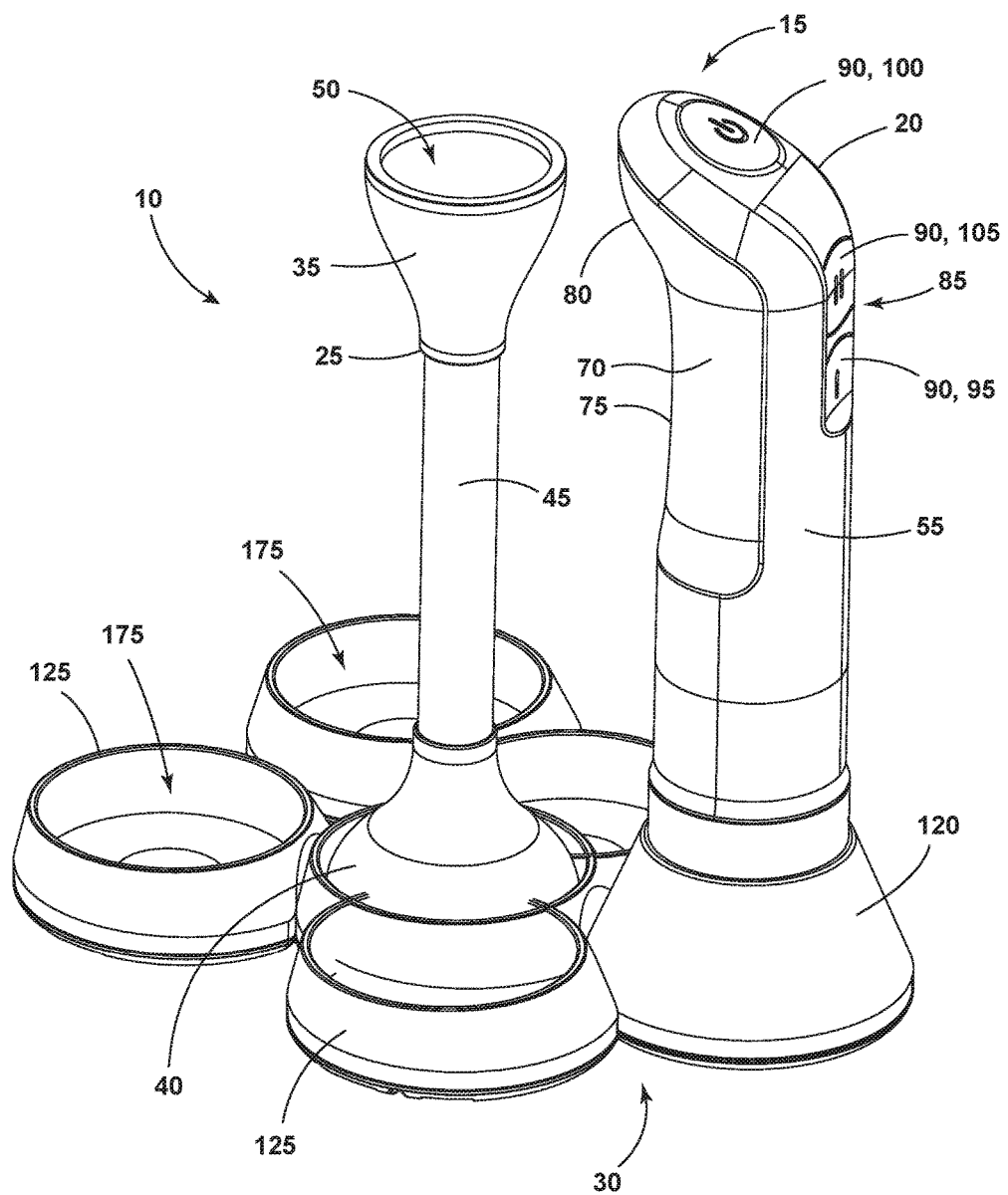
FIG. 1 is a perspective view of an appliance assembly according to one embodiment.
Figure 2:
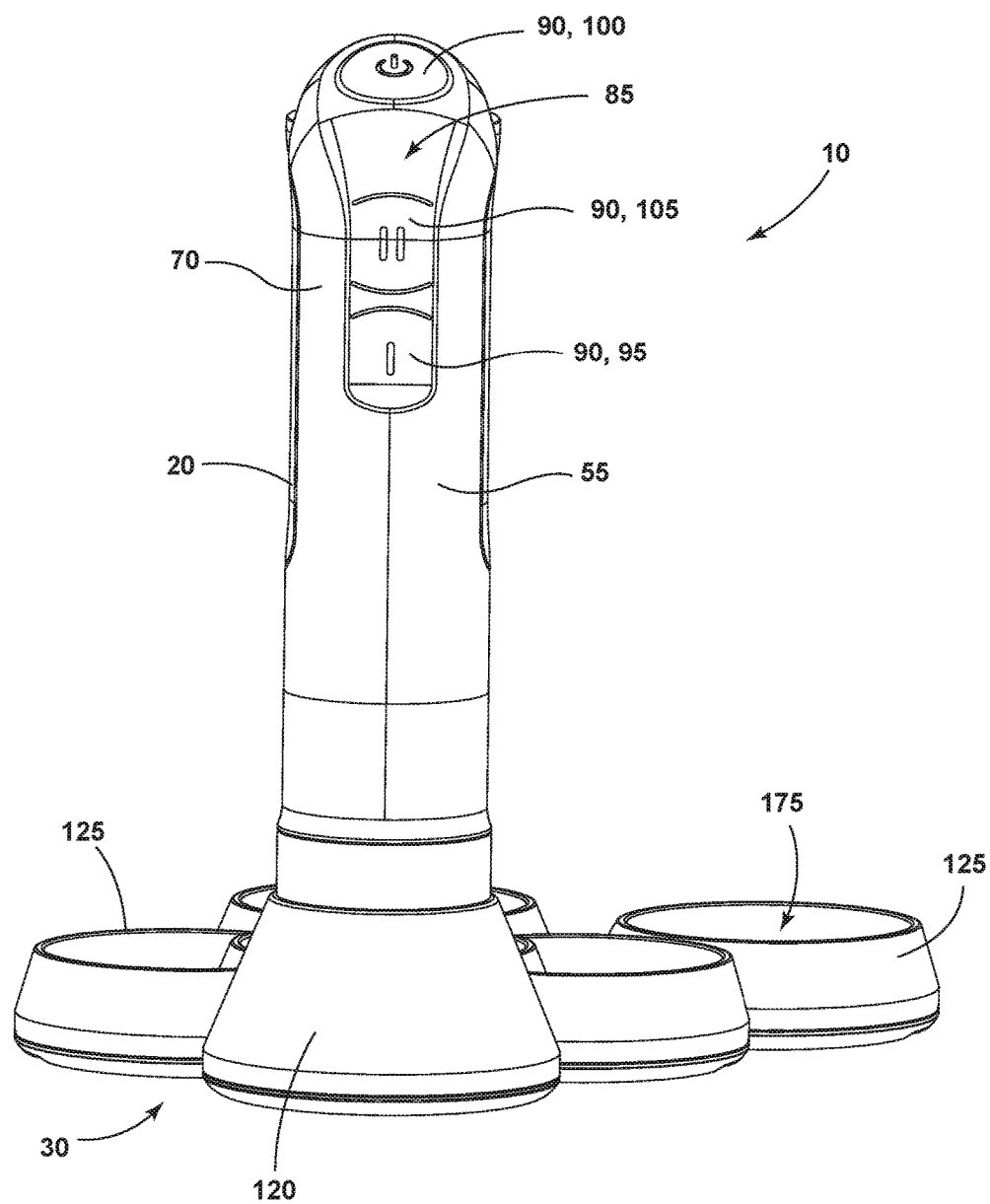
FIG. 2 is a front view of the appliance assembly of FIG. 1.
Figure 3:
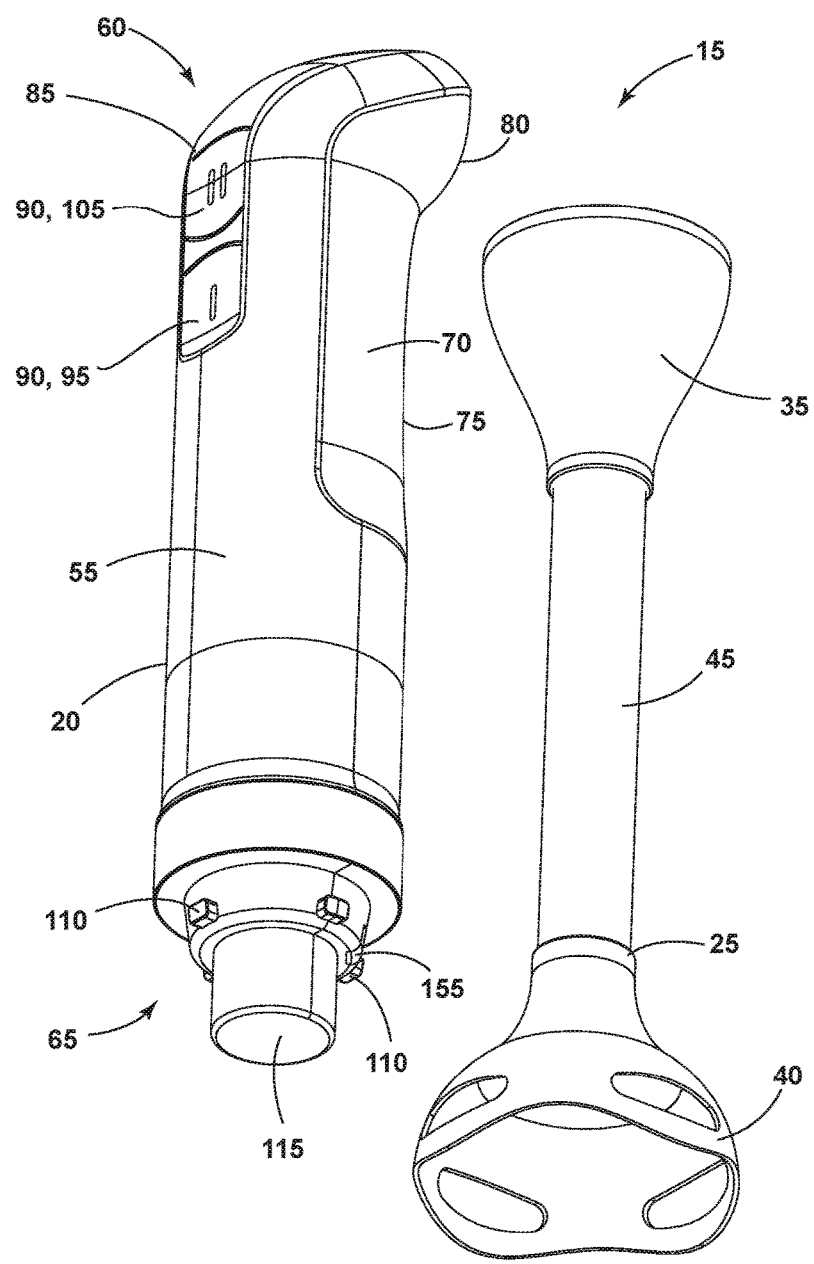
FIG. 3 is a bottom perspective view of a handheld appliance in a disconnected position.
Figure 4:
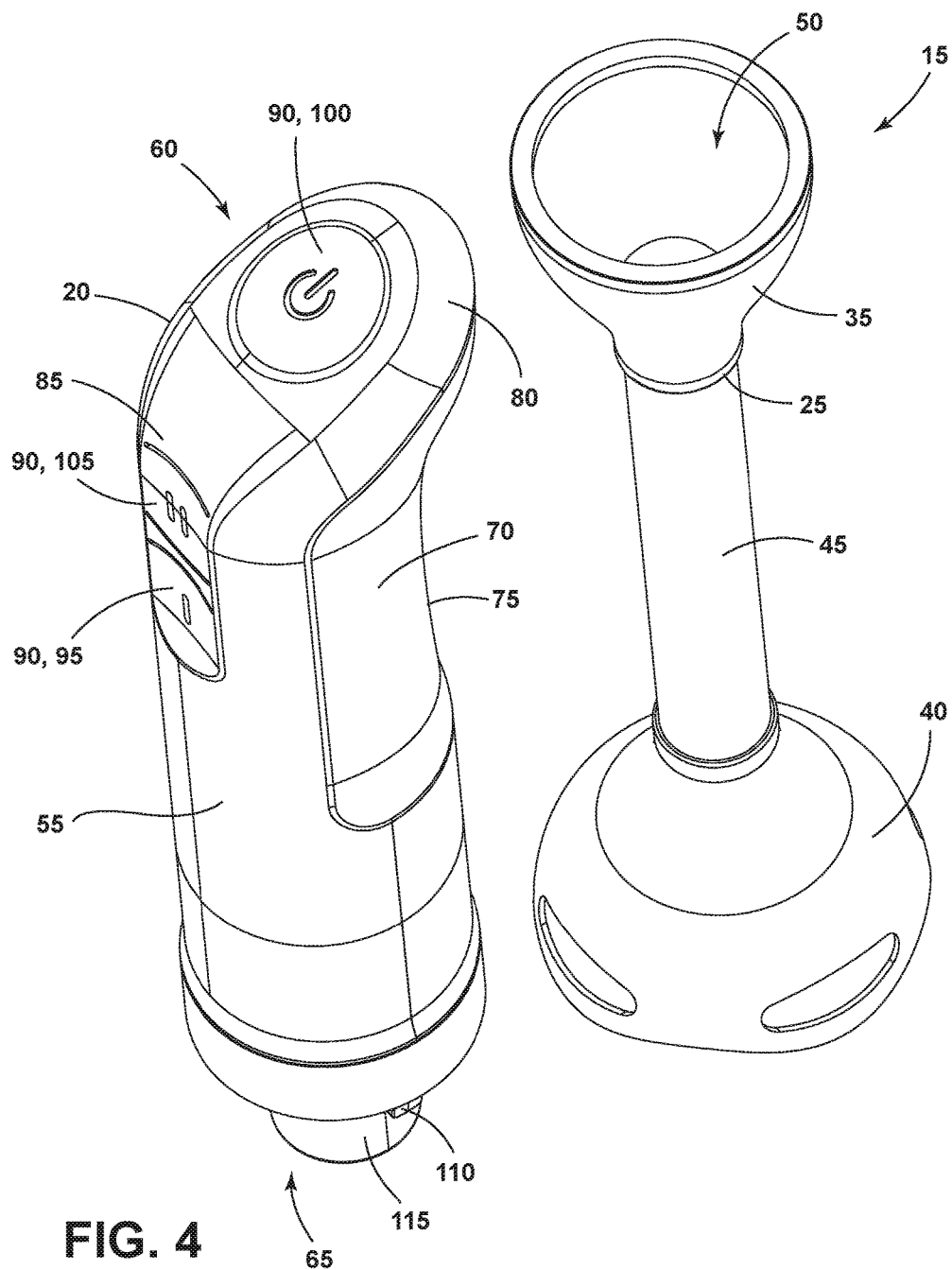
FIG. 4 is a top perspective view of the handheld appliance of FIG. 3 in a disconnected position.
Figure 5:
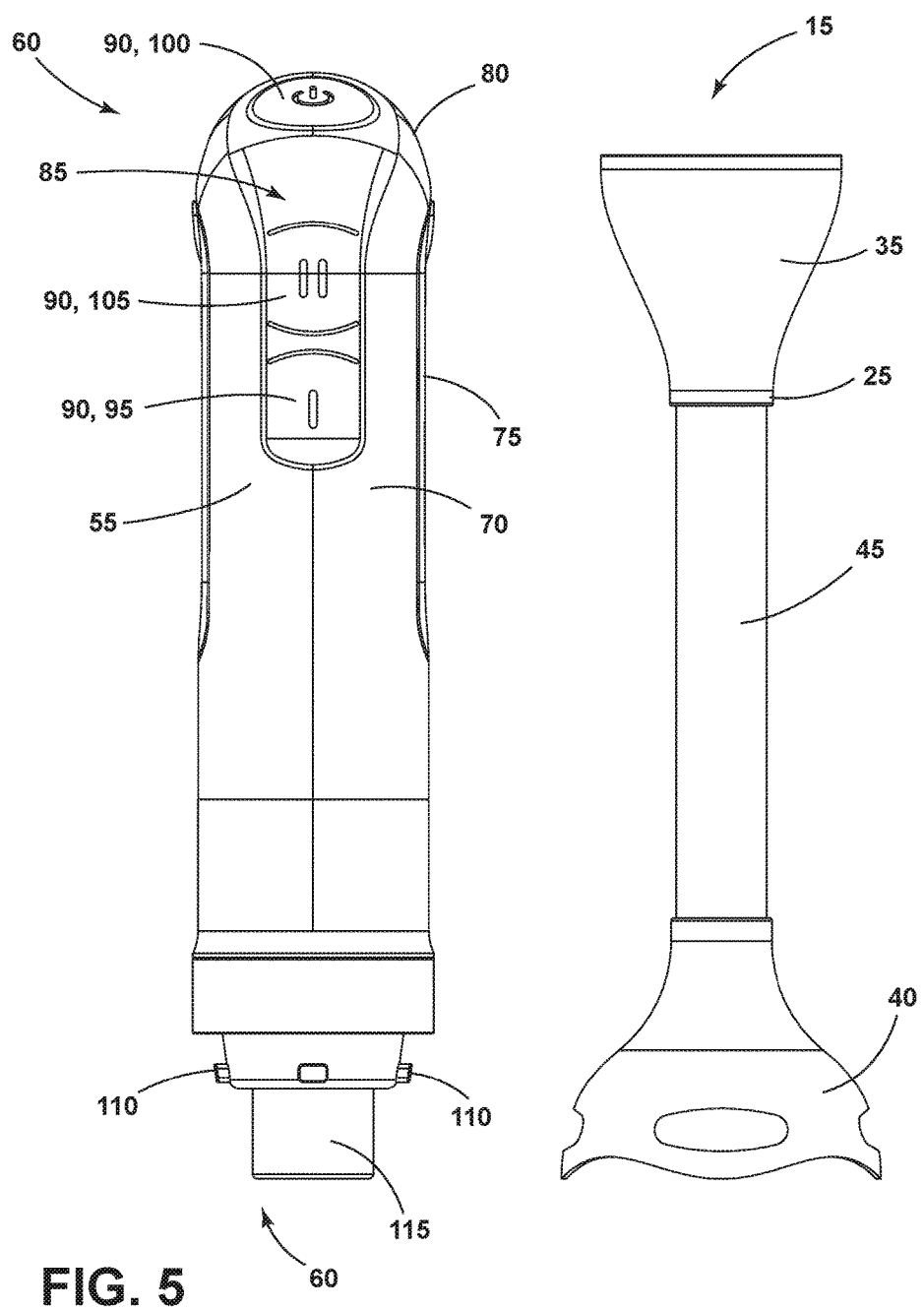
FIG. 5 is a front view of the handheld appliance of FIG. 3 in a disconnected position.

FIGS. 1 and 2 illustrate one embodiment of a kitchen appliance assembly 10. The kitchen appliance assembly 10 includes a handheld appliance 15 having a drive unit 20 and a tool 25, and a base 30 for supporting the handheld appliance 15. FIGS. 3-9 illustrate the handheld appliance 15 without the base 30. As shown, the drive unit 20 and the tool 25 are separate elements that can be selectively connected and disconnected. FIGS. 3-5 show the drive unit 20 and the tool 25 in a disconnected position, and FIGS. 6-9 show the drive unit 20 and the tool 25 in a connected position. When the handheld appliance 15 is not in use, the tool 25 can be detached from the drive unit 20 and placed on the base 30 for storage.

Figure 6:
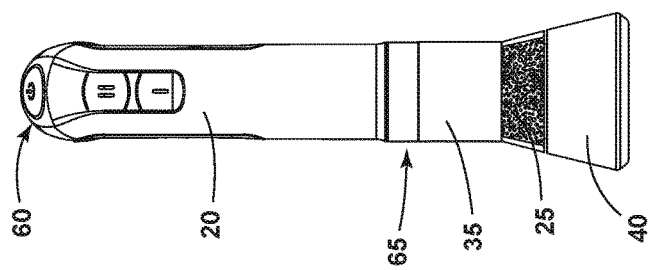
FIG. 6 is a front view of the handheld appliance of FIG. 3 in a connected position with a plunge blender attachment.
Figure 7:
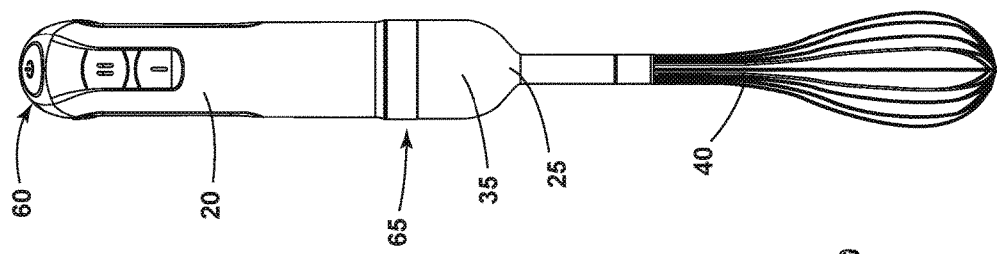
FIG. 7 is a front view of the handheld appliance of FIG. 3 in a connected position with a sauce stirrer attachment.
Figure 8:
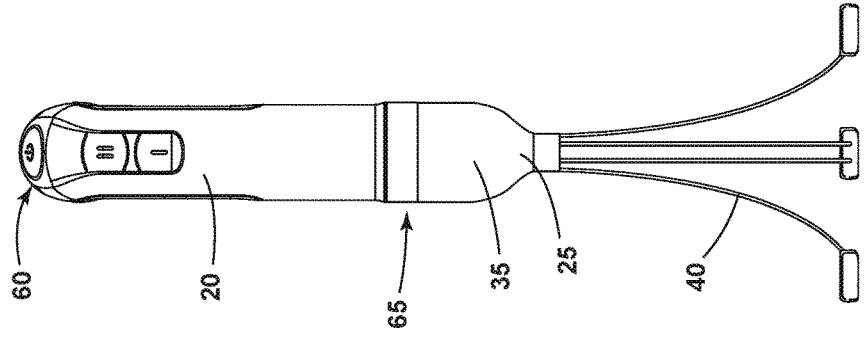
FIG. 8 is a front view of the handheld appliance of FIG. 3 in a connected position with a whisk attachment.
Figure 9:
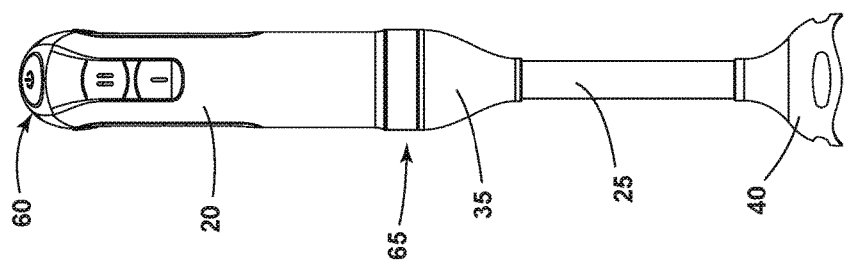
FIG. 9 is a front view of the handheld appliance of FIG. 3 in a connected position with a salt and pepper mill attachment.
Figure 10:
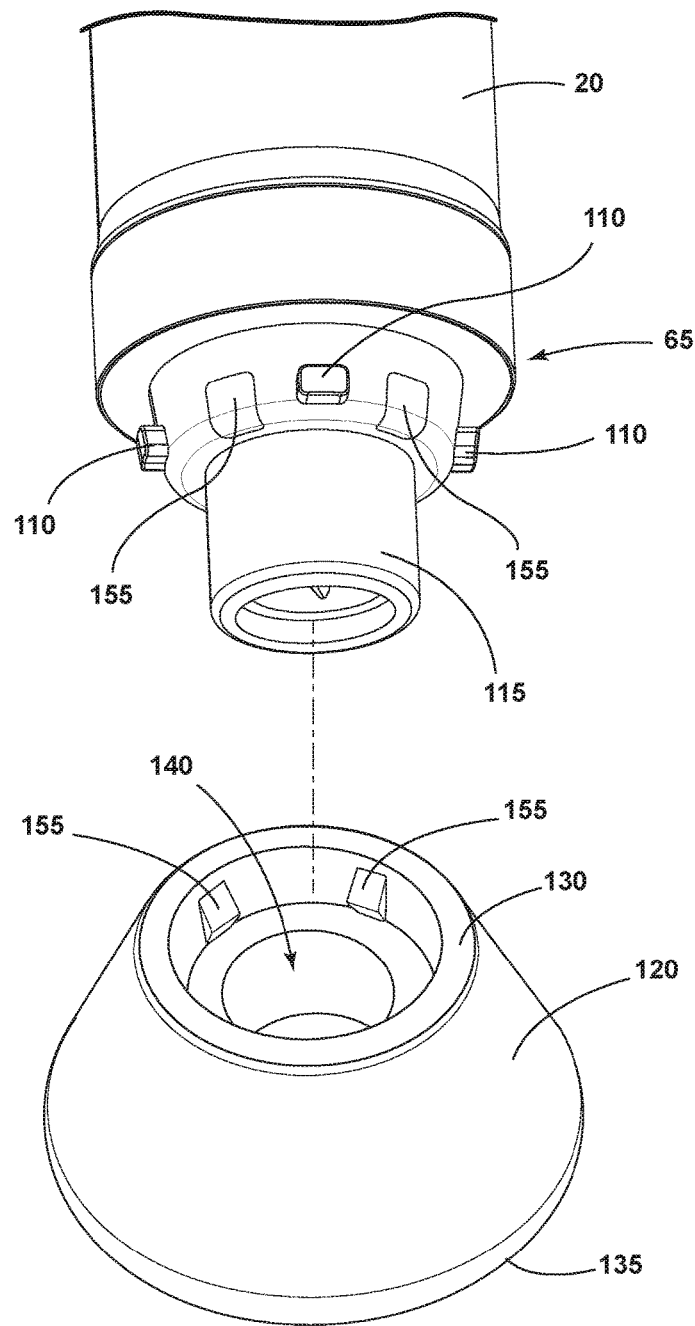
FIG. 10 is a perspective view of a charging unit according to one embodiment and a portion of the drive unit.
Figure 11:
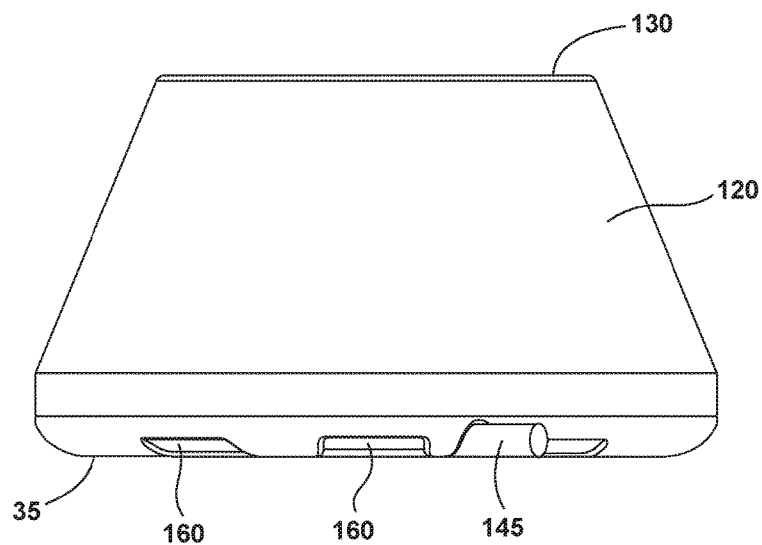
FIG. 11 is a back view of the charging unit of FIG. 10.
Figure 12:
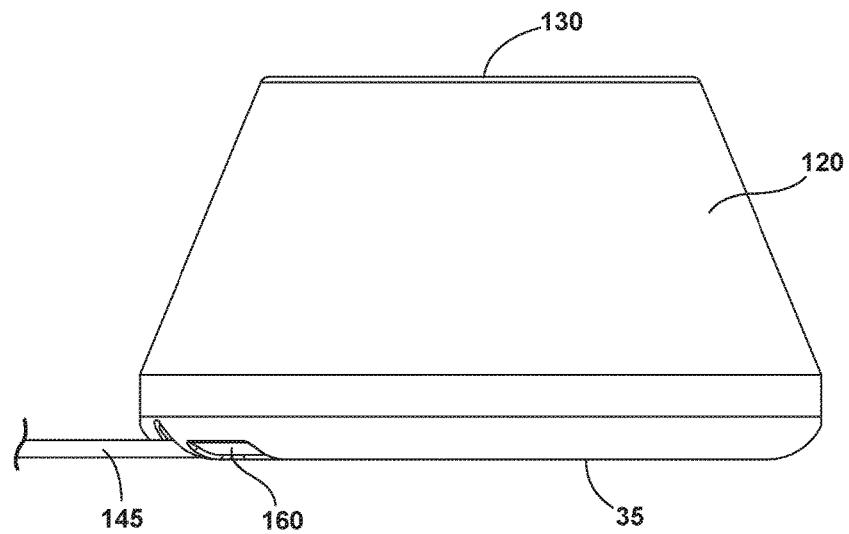
FIG. 12 is a side view of the charging unit of FIG. 10.
Figure 13:
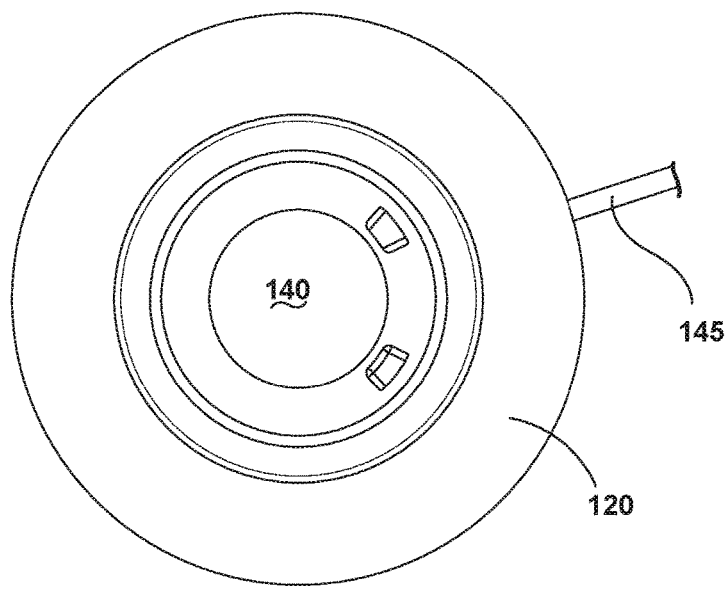
FIG. 13 is a top view of the charging unit of FIG. 10.

Referring to FIGS. 3-5, the tool 25 includes a first end forming an attachment portion 35 and a second end having a tool element 40. In the illustrated embodiment, the attachment portion 35 and the tool element 40 are spaced apart by a rod 45. The attachment portion 35 includes a receptacle 50 that is sized and shaped to receive a portion of the drive unit 20 for connecting the tool 25 to the drive unit 20. The tool element 40 can be any type of kitchen tool. FIGS. 6-9 illustrate some examples of tool elements 40. FIG. 6 illustrates a plunger blender, FIG. 7 illustrates a sauce stirrer, FIG. 8 illustrates a whisk, and FIG. 9 illustrates a spice mill. Other examples of different kitchen tools include, but are not limited to, slicing knives, knife sharpeners, cork screws, and can openers. In some embodiments, the handheld appliance 15 includes a drive unit 20 and tools 25, where each tool 25 includes a different tool element 40. In this embodiment, the drive unit 20 can be connected to any of the tools 25 to drive the operation of the tool 25. Then drive unit 20 is disconnected from one tool 25 and connected to a different tool 25 in order to use a tool 25 with a different tool element 40.

Referring back to FIGS. 3-5, the drive unit 20 includes a housing 55 that supports a motor (not shown) and a rechargeable battery (not shown) for providing power to the motor. The housing 55 is elongated and defines an axis extending between a first end 60 and a second end 65 that is spaced apart from the first end 60. A handgrip 70 is formed on the first end 60 of the housing 55 to enable a user to grasp the drive unit 20 to operate the handheld appliance 15. In the illustrated embodiment, the handgrip 70 has a linear portion 75 and a curved portion 80. The linear portion 75 can be grasped by a user's palm with the user's fingers wrapped around the linear portion 75. The curved portion 80 extends above the user's hand to prevent the drive unit 20 from slipping out of the user's hand during operation.

A user interface 85 is also disposed on the first end 60 of the housing 55. The user interface 85 includes controls 90 (e.g., buttons) for controlling operation of the drive unit 20. For example, the illustrated user interface 85 includes a power button 95, a start/stop button 100, and a speed button 105. The power button 95 is used to turn the drive unit 20 on and to provide power to the motor. The start/stop button 100 is used to actuate the tool 25. The speed button 105 is used for changing speed of the tool 25. In another embodiment, greater or fewer controls 90 may be included in the user interface 85. In the illustrated embodiment, some of the controls 90 of the user interface 85 are positioned on the linear portion 75 of the handgrip 70 and some of the controls 90 are positioned on the curved portion 80 of the handgrip 70. The controls 90 on the linear portion 75 of the handgrip 70 can be actuated by a user's fingers while maintaining a grasp on the handgrip 70. The controls 90 on the curved portion 80 of the handgrip 70 can be actuated by a user's thumb while maintaining a grasp on the handgrip 70.

With continued reference to FIGS. 3-5, the second end 65 of the drive unit 20 engages with the tool 25 to connect the tool 25 to the drive unit 20 and to drive the operation of the tool element 40. Specifically, an attachment member 110 is disposed on the second end 65 of the housing 55 for releasably connecting the tool 25 to the drive unit 20. The attachment member 110 enables the tool 25 to be connected and disconnected from the drive unit 20 without the use of tools. In the illustrated embodiment, the attachment member 110 is a detent that engages with the tool 25. In some embodiments, the detent is spring biased towards a locked position, and a release button is used to move the detent against the spring bias to release the tool 25 from the drive unit 20. In another embodiment, the attachment member 110 is a threaded connection for screwing the drive unit 20 and the tool 25 together. In other embodiments, different types quick connect mechanisms known to those skilled in the art can be used to releasably connect the drive unit 20 and the tool 25.

Once connected to the drive unit 20 via the attachment member 110, the tool 25 is driven by a drive shaft 115 extending from the second end 65 of the drive unit 20. The drive shaft 115 extends along the axis of the housing 55 in direction away from the handgrip 70. The drive shaft 115 is driven by the motor and engages with the tool 25 to thereby drive the operation of the tool 25. In the illustrated embodiment, when the tool 25 is attached to the drive unit 20, the tool 25 is fixed with respect to the drive shaft 115 so that movement of the drive shaft 115 is transferred to the tool 25.

As shown in FIGS. 1 and 2, when the handheld appliance 15 is not in use, a user can disconnect the tool 25 from the drive unit 20 and place the handheld appliance 15 on the base 30 for storage and charging. The base 30 includes a charging unit 120 and cradles 125. The charging unit 120 supports and charges the drive unit 20 and the cradle 125 supports the tool 25.

FIGS. 10-14 illustrate various views of the charging unit 120. As shown, the charging unit 120 has a frustoconical shape with an open top end 130 and a closed bottom end 135. The open top end 130 forms a cavity 140 for receiving the second end 65 of the drive unit 20. The cavity 140 is sized and shaped to receive the second end 65 of the drive unit 20. For example, in the illustrated embodiment, the cavity 140 is sized and shaped to receive the drive shaft 115 of the drive unit 20. The charging unit 120 supports the drive unit 20 in an upright position. In other embodiments, the charging unit 120 may support the drive unit 20 in other orientations. The charging unit 120 can be other shapes and sizes that are sufficient to support the drive unit 20.

In addition, the charging unit 120 includes a power source 145 and electrical components that are arranged to recharge the battery of the drive unit 20 when the drive unit 20 is received within the charging unit 120. Specifically, the charging unit 120 includes a power cord 145 that receives AC power and electrical components that convert the AC power to a charging current. An electrical contact 150 is disposed within the cavity 140 of the charging unit 120 and positioned within the cavity 140 so that the contact 150 aligns with an electrical contact 155 on the drive unit 20. When the drive unit 20 is inserted into the charging unit 120, the contact 155 of the drive unit 20 engages with the contact 150 of the charging unit 120, which enables the charging current to pass from the charging unit 120 to the drive unit 20 to charge the battery.

Figure 14:
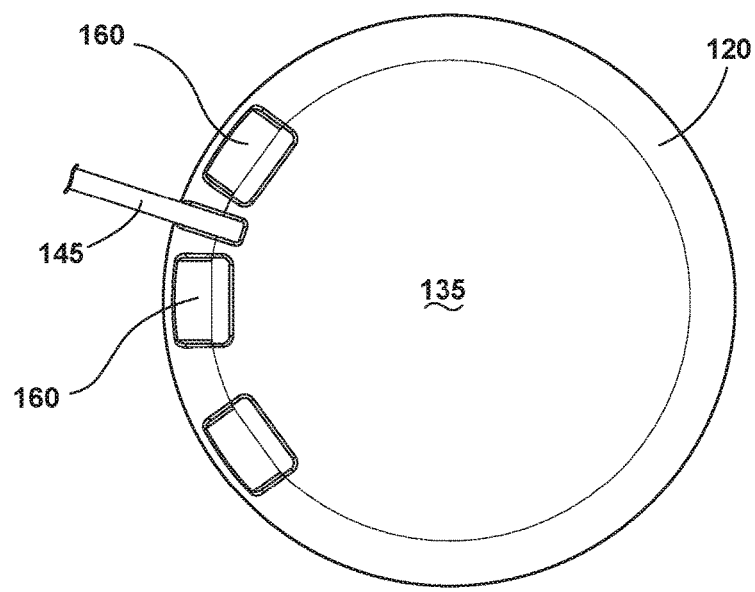
FIG. 14 is a bottom view of the charging unit of FIG. 10.
Figure 15:
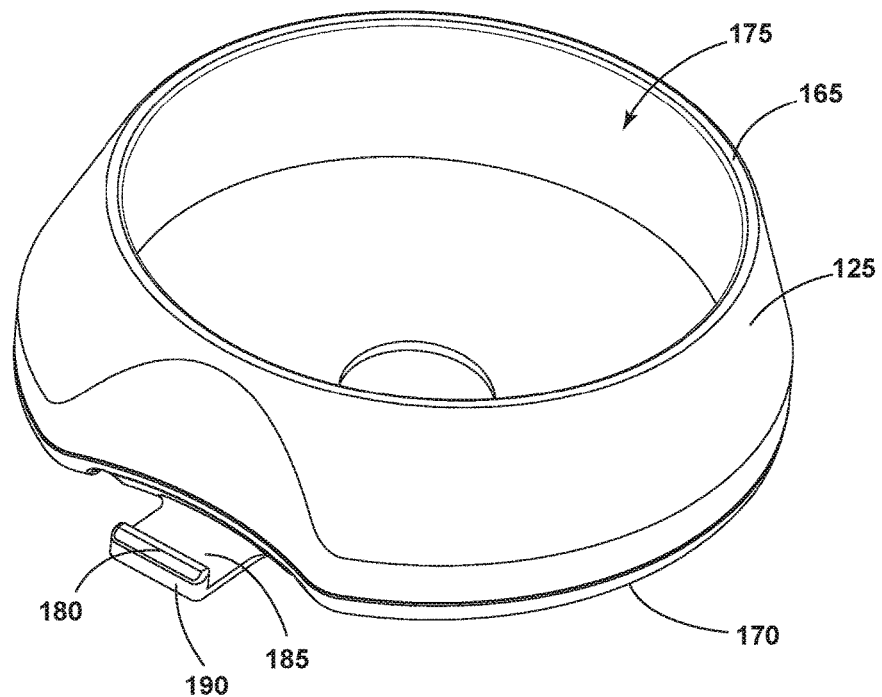
FIG. 15 is a perspective view of a cradle according to one embodiment.
Figure 16:
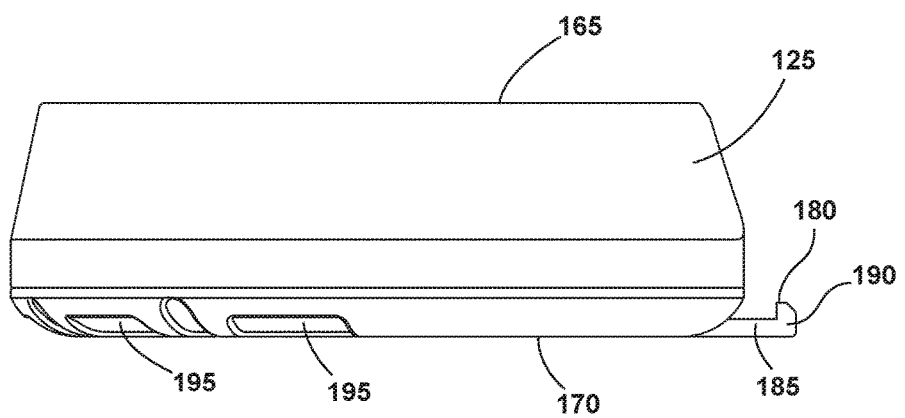
FIG. 16 is a side view of the cradle of FIG. 15.
Figure 17:
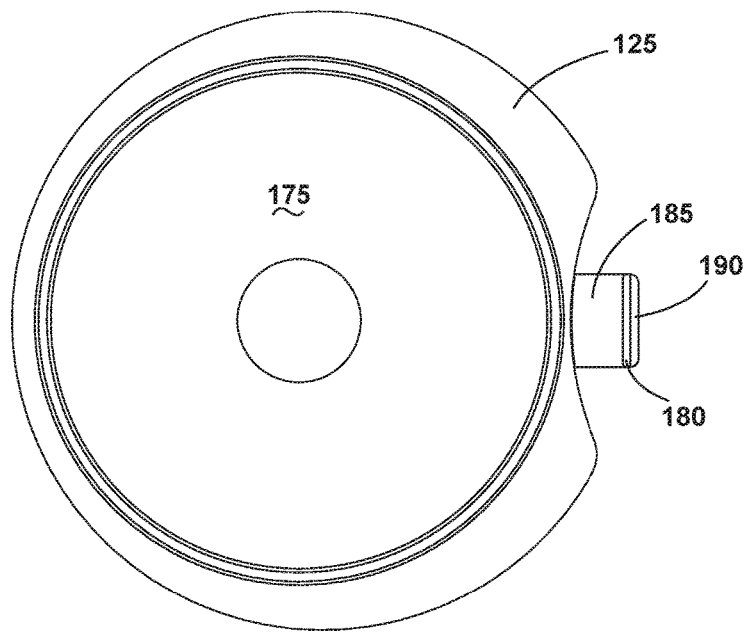
FIG. 17 is a top view of the cradle of FIG. 15.
Figure 18:
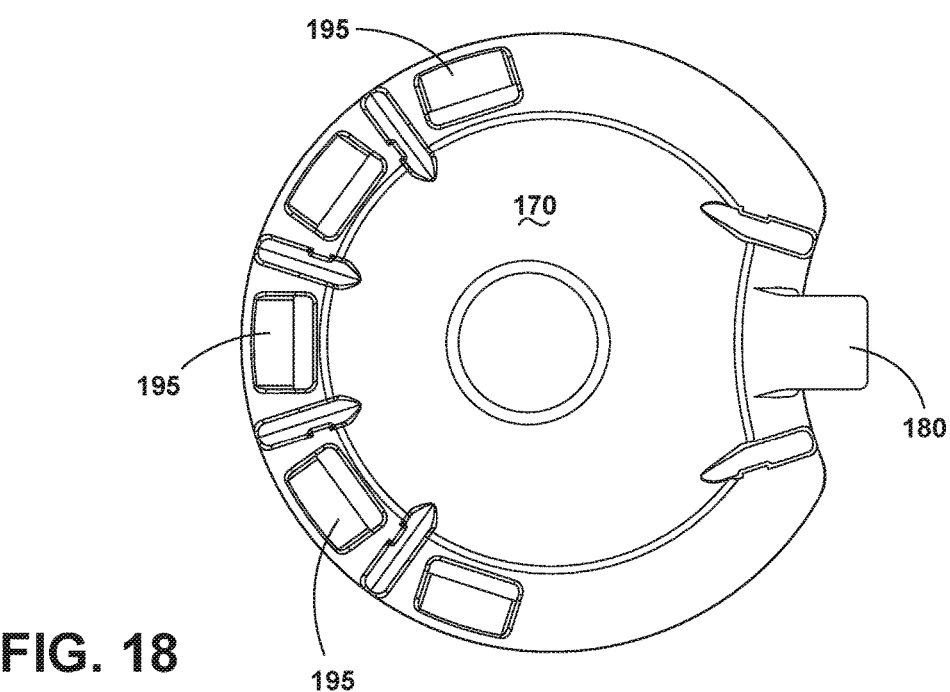
FIG. 18 is a bottom view of the cradle of FIG. 15.
Figure 19:
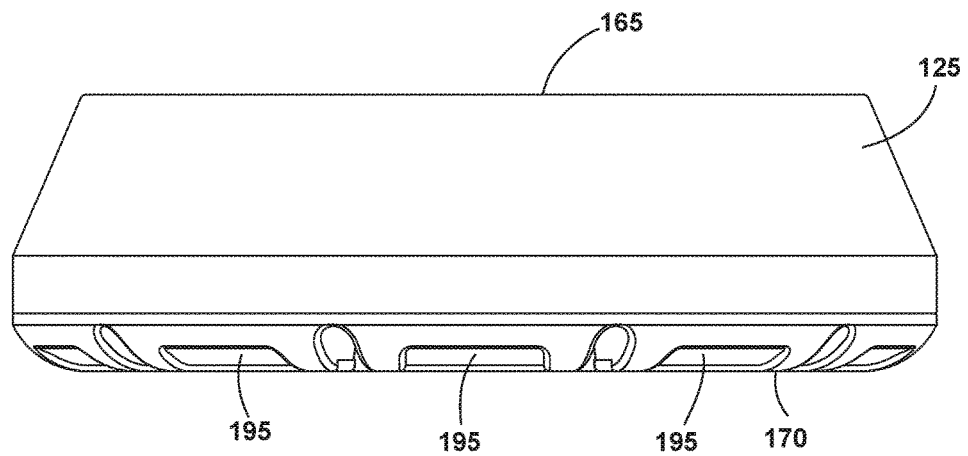
FIG. 19 is a back view of the cradle of FIG. 15.
Figure 20:
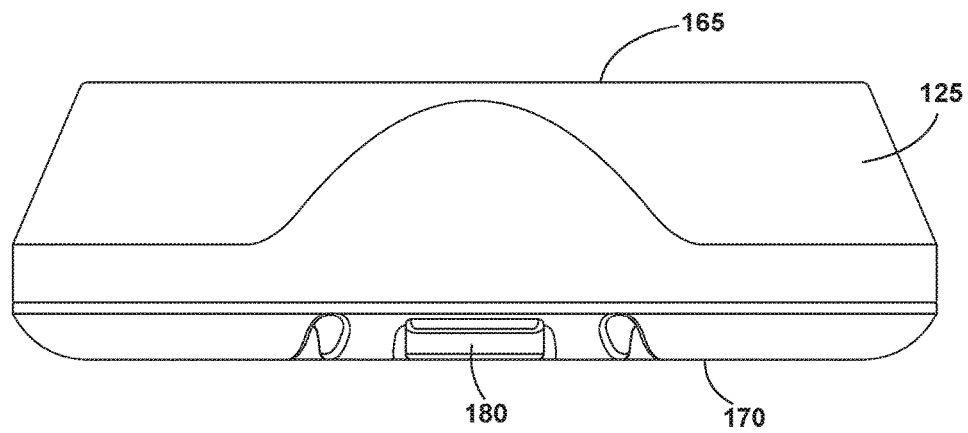
FIG. 20 is a front view of the cradle of FIG. 15.

Referring to FIG. 14, the charging unit 120 also includes recesses 160 along the bottom end 135 of the charging unit 120. As will be described in greater detail below, the recesses 160 are used to connect the cradle 125 to the charging unit 120. The recesses 160 are arranged around the perimeter of the charging unit 120, and each recess 160 is engagable with the cradle 125. In the illustrated embodiment, the charging unit 120 includes three recesses 160. However, in other embodiments, the charging unit 120 includes greater or fewer recesses 160.

FIGS. 15-20 illustrate various views of the cradle 125. The cradle 125 has a substantially cylindrical shape with an open top end 165 and a closed bottom end 170. The top end 165 forms an opening 175 for receiving the tool 25. The opening 175 is sized and shaped to receive the tool 25. In some embodiments, the opening 175 is sized and shaped to receive a tool 25 with a specific tool element 40. In other embodiments, the opening 175 is sized and shaped more generally to receive a tool 25 with any of the tool elements 40. In other embodiments, the cradle 125 can be other shapes and sizes that are sufficient to support the drive unit 20.

The cradle 125 includes a linkage 180 for connecting the cradle 125 to the charging unit 120. In the illustrated embodiment, the linkage 180 is a tab 185 with a hook 190 at the end of it. The tab 190 extends from the bottom end 65 of the cradle 125 and extends radially outward to engage with a recess 160 on the charging unit 120. In other embodiments, the linkage 180 is another type of coupling member. The recesses 160 on the charging unit 120 are sized and shaped to receive the linkage 180 of the cradle 125. The linkages 180 can snap into and out of the recesses 160 to connect and disconnect the cradle 125 from the charging unit 120. The linkage 180 can engage with any of the recesses 160 on the charging unit 120 in order to adjust the cradle 125 to different angles relative to the charging unit 120. Furthermore, because the charging unit 120 includes multiple recesses 160, multiple cradles 125 can be connected to the charging unit 120 at the same time. Therefore, when the handheld appliance 15 includes a plurality of tools 25, each tool 25 can be supported by a different cradle 125.

In addition, each cradle 125 includes recesses 195. The recesses 195 are arranged around the perimeter of the cradle 125. Each recess 195 is sized and shaped to receive a linkage 180 of one of the other cradles 125. This enables the cradles 125 to be connected to one another in addition to being connected to the charging unit 120. Similar to the charging unit 120, because the cradle 125 includes multiple recesses 195, the cradle 125 can be connected to multiple other cradles 125 at the same time. Accordingly, the base 30 can take on different arrangements depending on the number of cradles 125, and the arrangement and orientation of the cradles 125 and the charging unit 120.

Figure 21:
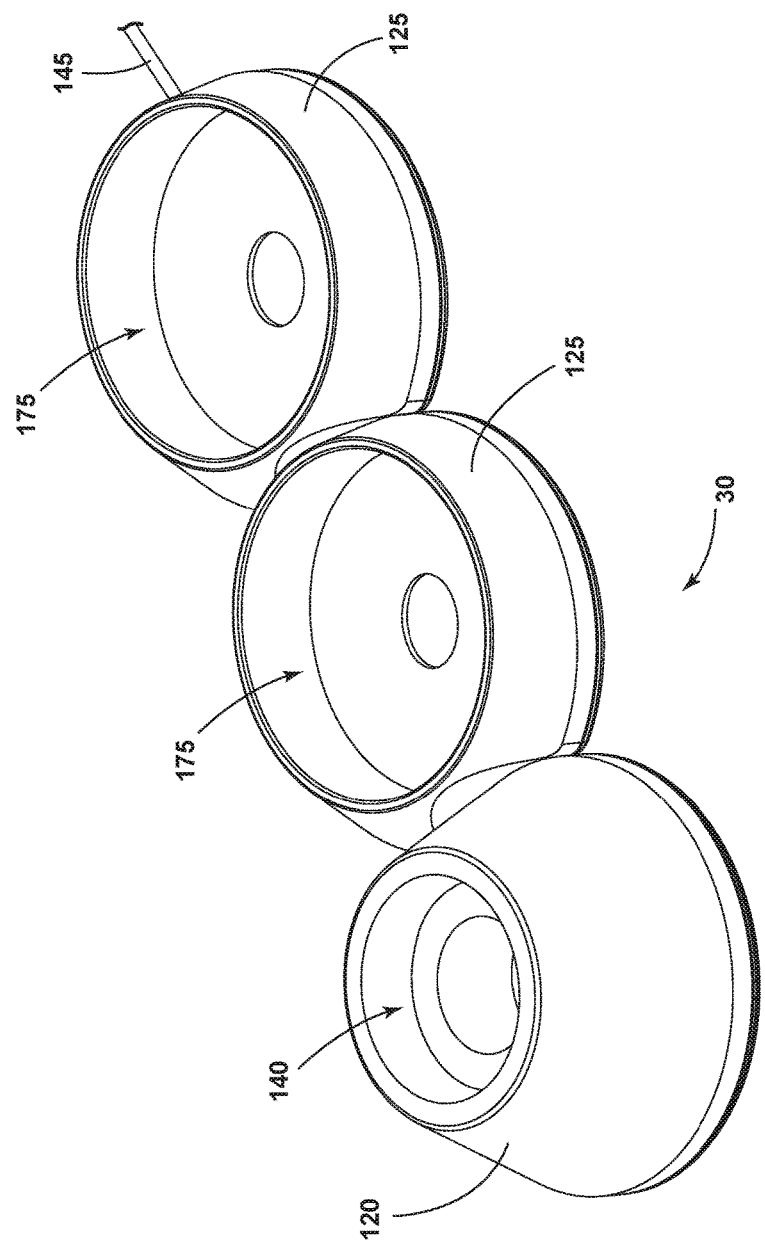
FIG. 21 is a perspective view of an arrangement of the base according to one embodiment.
Figure 22:
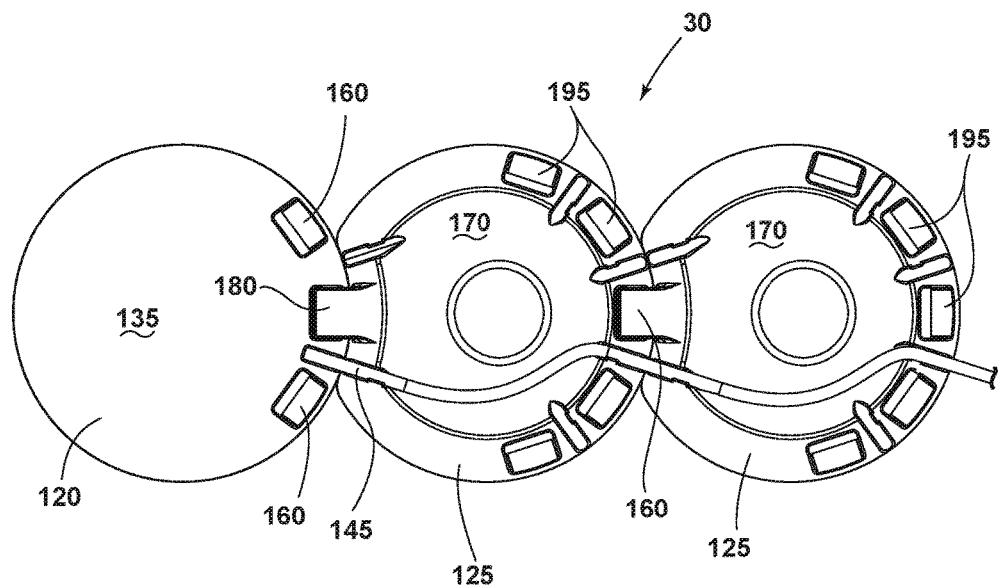
FIG. 22 is a bottom view of the arrangement of the base according to FIG. 21.
Figure 23:
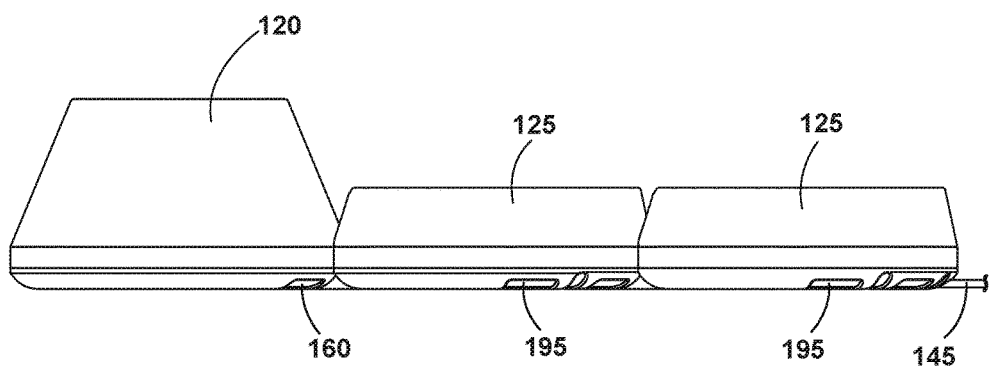
FIG. 23 is a side view of the arrangement of the base according to FIG. 21.
Figure 24:
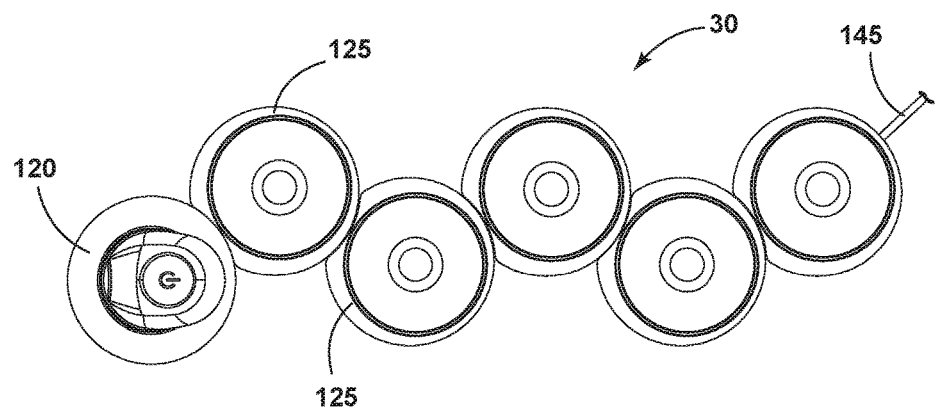
FIG. 24 is an exemplary arrangement of the base.
Figure 25:
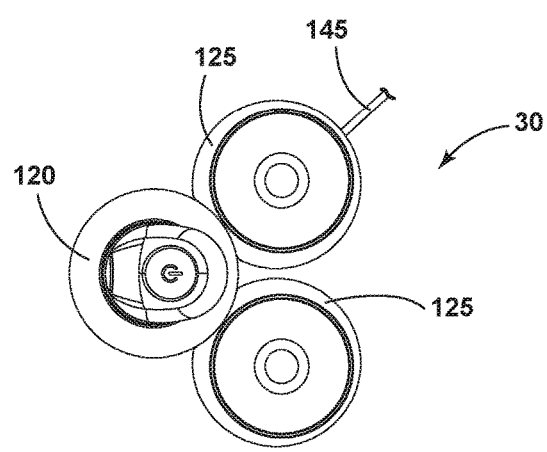
FIG. 25 is an exemplary arrangement of the base.
Figure 26:
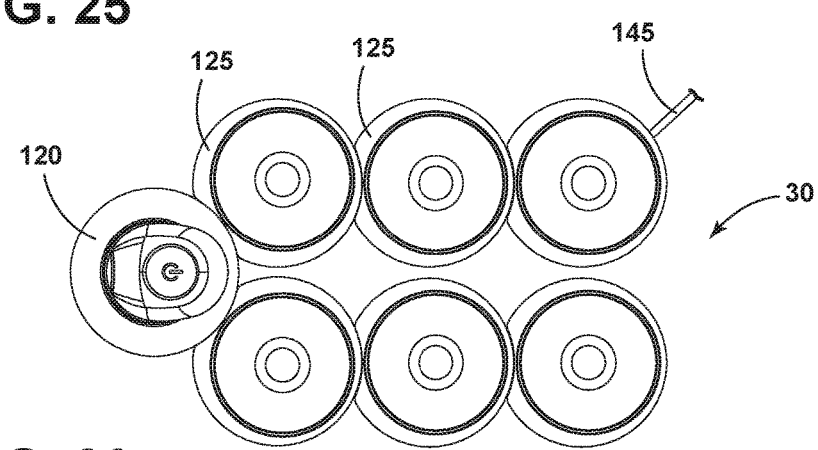
FIG. 26 is an exemplary arrangement of the base.
Figure 27:
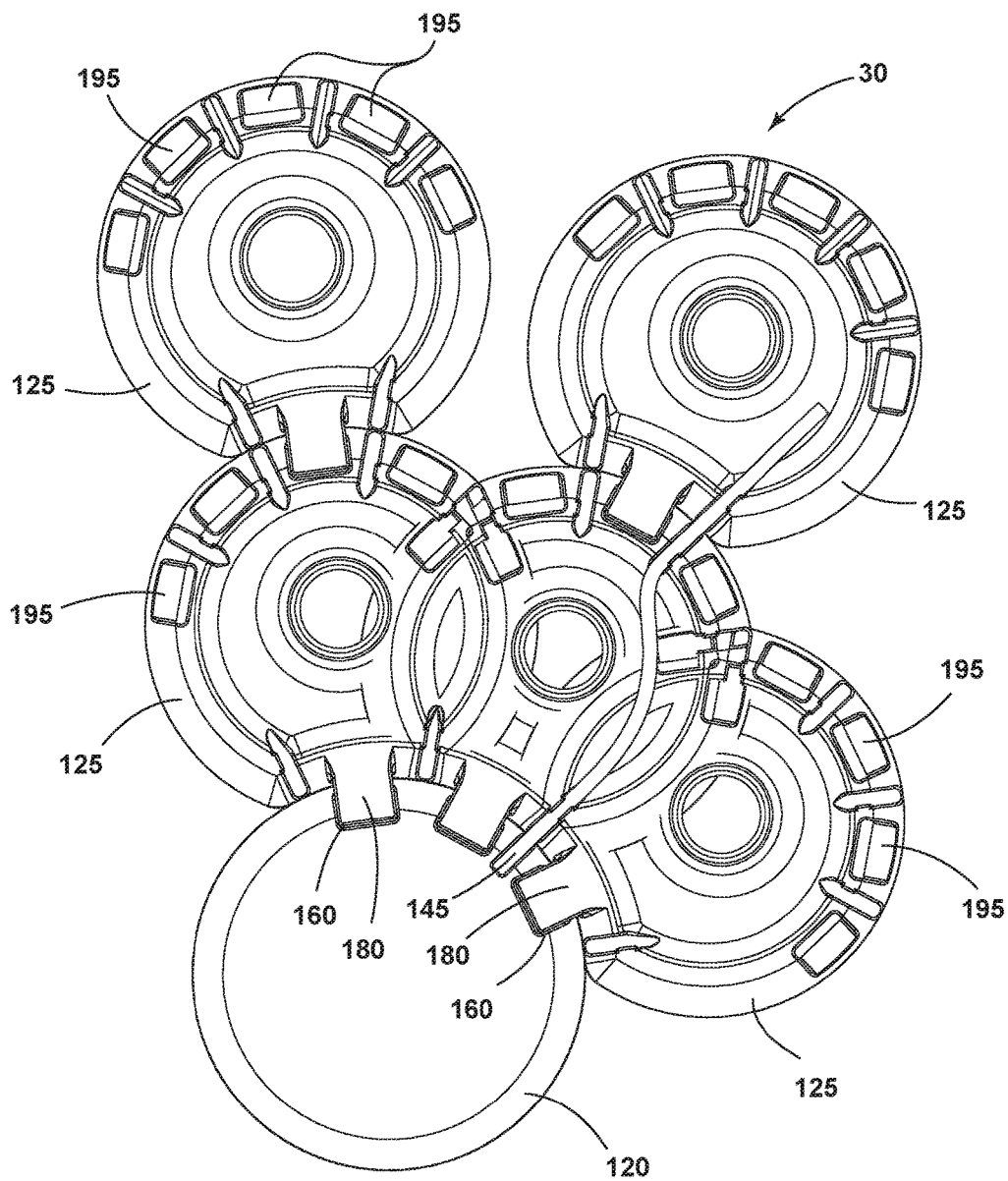
FIG. 27 is an exemplary arrangement of the base.

FIGS. 21-27 illustrate some examples of different arrangements of the base 30. In FIG. 21-23, the base 30 includes the charging unit 120 and three cradles 125. The charging unit 120 is positioned in the front of the base 30 and the cradles 125 are connected to the charging unit 120 in a row. In other words, the first cradle 125a is connected to the charging unit 120, the second cradle 125b is connected to the first cradle 125a, and the third cradle 125c is connected to the second cradle 125b. The charging unit 120 and the cradles 125 are oriented in a linear arrangement so that the row is generally straight. Specifically, the linkages 180 of each cradle 125 are connected to a central recess 160, 195. In other embodiments, the linkages 180 can be connected to non-central recesses 160, 195 in order to create a wavy pattern. FIGS. 24-27 illustrate the base 30 according to some of the other possible arrangements of the charging unit 120 and the cradles 125. These arrangements are non-exclusive examples of how to arrange the charging units 120 and cradles 125.

Figure 28:
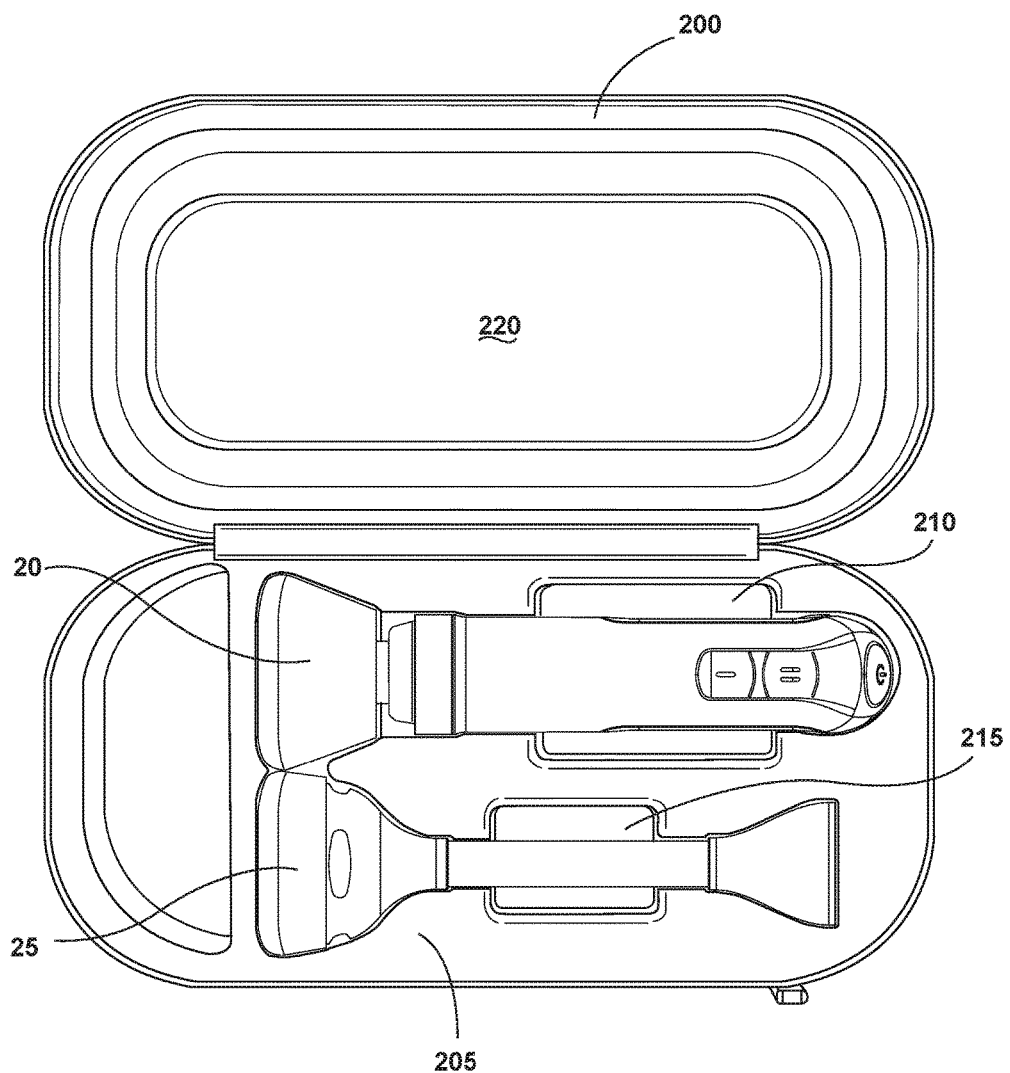
FIG. 28 is a top view of a case for storing the drive unit and the tool.

In addition to storing the handheld appliance 15 on the base 30, the handheld appliance 15 may also be stored in a case 200, as shown in FIG. 28. The case 200 includes a storage compartment 205 with a first slot 210 that is sized and shaped to receive the drive unit 20 and a second slot 215 that is sized and shape to receive the tool 25. The case 200 also includes a cover 220 for closing the storage compartment 205.

The handheld appliance as disclosed herein provides a single drive unit that is capable of operating multiple types of tools that are capable of a wide variety of tasks. In addition, the drive unit and the tools can all be stored together on a base that simultaneously charges the drive unit while the handheld appliance is stored. The flexibility of the base to be adjusted to many different configurations allows the user to fit the base into cabinets or countertop spaces of many shapes and sizes.

The invention claimed is:

1. A handheld kitchen appliance assembly comprising:
   a drive unit including a housing, a rechargeable battery disposed within the housing, and a motor disposed within the housing and powered by the battery;
   a tool including an attachment portion for releasably connecting the tool to the drive unit, the tool selectively driven by the drive unit when the tool is connected to the drive unit;
   a charging unit including a cavity sized and shaped to receive a portion of the drive unit, the charging unit having a power supply and configured to send a charging current to the battery of the drive unit to recharge the battery when the drive unit is received within the cavity; and
   a cradle including an opening sized and shaped to support the tool when the tool is disconnected from the drive unit, the cradle having a linkage engagable with the charging unit for selectively connecting the cradle to the charging unit,
   wherein the charging unit includes a plurality of recesses, each of the recesses sized and shaped to receive the linkage of the cradle; and
   wherein the plurality of recesses is arranged around a perimeter of the charging unit, and wherein the cradle can be positioned at different angles relative to the charging unit by engaging with different recesses.

2. The handheld kitchen appliance assembly of claim 1, wherein the tool is one of a plurality of tools and the cradle is one of a plurality of cradles, the plurality of cradles each including an opening sized and shaped to receive one of the plurality of tools.

3. The handheld kitchen appliance assembly of claim 2, wherein the linkage of each of the plurality of cradles is engagable with the charging unit for selectively connecting the respective cradle to the charging unit, wherein the plurality of cradles are connectable to the charging unit at the same time.

4. The handheld kitchen appliance assembly of claim 3, wherein the plurality of cradles each includes a recess sized and shaped to receive the linkage of one of the other plurality of cradles.

5. The handheld kitchen appliance assembly of claim 1, wherein the drive unit includes a handgrip and a user interface having a plurality of actuators for controlling the drive unit, the user interface positioned proximate the handgrip to enable a user to grasp the handgrip and engage with the user interface using one hand.

6. The handheld kitchen appliance assembly of claim 1, wherein the tool is a mixing tool.

7. A base for supporting a kitchen appliance including a drive unit and a plurality of tools configured to be driven by the drive unit, the drive unit having a rechargeable battery, a motor, and a first electrical contact, the plurality of tools each having a tool element and an attachment portion for releasably connecting the tool to the drive unit, the base comprising:
a charging unit including a cavity sized and shaped to receive a portion of the drive unit to support the drive unit, the cavity including a second electrical contact, the second electrical contact configured to engage with the first electrical contact of the drive unit when the drive unit is received within the charging unit;
a power supply connected to the charging unit, the power supply configured to provide power to the charging unit to enable the charging unit to send a charging current to the battery of the drive unit via the first electrical contact and the second electrical contact; and
a plurality of cradles for supporting the plurality of tools, the plurality of cradles each including an opening sized and shaped to receive one of the plurality of tools,
wherein each of the plurality of cradles includes a linkage engagable with the charging unit for releasably connecting the respective cradle to the drive unit,
wherein each of the plurality of cradles includes a plurality of recesses sized and shaped to receive the linkage of another one of the plurality of cradles for releasable connecting the plurality of cradles to one another; and
wherein the charging unit is connectable to more than one of the plurality of cradles at the same time, and wherein each of the plurality of cradles is connectable to more than one of the plurality of cradles at the same time.

8. The base of claim 7, wherein the charging unit is configured to support the drive unit in an upright position, and wherein at least one of the plurality of cradles is configured to support at least one of the plurality of tools in an upright position.

9. The base of claim 7, wherein the charging unit includes a plurality of recesses, each of the plurality of recesses sized and shaped to receive the linkage of one of the plurality of cradles, and wherein the linkages of the plurality of cradles are engagable with one of the plurality of recesses.

10. The base of claim 7, wherein the charging unit and the plurality of cradles are configurable in a plurality of different arrangement relative to one another.

11. A handheld kitchen appliance assembly, comprising:
a drive unit including
a housing having an elongated body with a first end and a second end that is spaced apart from the first end,
a rechargeable battery disposed within the housing,
a motor disposed within the housing and powered by the battery,
an attachment member positioned on the second end of the housing, and
a first electrical contact positioned on the second end of the housing, the electrical contact configured to receive a charging current and send the charging current to the battery to recharge the battery;
a tool including a tool element and an attachment portion, the attachment portion configured to engage with the attachment member of the drive unit to connect the tool to the drive unit; and
a base including
a charging unit having a cavity with a second electrical contact, the cavity configured to receive the second end of the drive unit so that the first electrical contact of the drive unit engages with the second electrical contact of the charging unit, the second electrical contact configured to send the charging current to the first electrical contact, and
a cradle having an opening for receiving a portion of the tool, the cradle including a linkage engagable with the charging unit for selectively connecting the cradle to the charging unit,
wherein each of the plurality of cradles further includes a linkage engagable with the charging unit for selectively connecting the cradle to the charging unit, wherein the plurality of cradles are connectable to the charging unit at the same time.

12. The handheld kitchen appliance assembly of claim 11, wherein the tool is one of a plurality of tools and the cradle is one of a plurality of cradles, the plurality of cradles each including an opening sized and shaped to receive one of the plurality of tools.

13. The handheld kitchen appliance assembly of claim 12, wherein each of the plurality of cradles includes a recess sized and shaped to receive the linkage of one of the other plurality of cradles.

14. The handheld kitchen appliance assembly of claim 12, wherein the charging unit is configured to support the drive unit in an upright position, and wherein at least one of the plurality of cradles is configured to support at least one of the plurality of tools in an upright position.

* * * * *